United States Patent [19]

Nauta

[11] 3,982,640
[45] Sept. 28, 1976

[54] SILO OR RESERVOIR FOR FREE FLOWING SOLID MATERIAL

[75] Inventor: Drewes Jan Nauta, Wormerveer, Netherlands

[73] Assignee: Machinefabriek en Constructiewerkplaats Gebr. Klinkenberg B.V., Wormerveer, Netherlands

[22] Filed: Feb. 6, 1975

[21] Appl. No.: 547,571

[30] Foreign Application Priority Data

Feb. 8, 1974  Netherlands .................... 7401790

[52] U.S. Cl. ..................... 214/17 CB; 52/298; 214/17 DB
[51] Int. Cl.² .......................... B65G 65/32
[58] Field of Search ......... 214/17 CB, 17 A, 17 DB; 52/249, 407, 408, 292–299

[56] References Cited
UNITED STATES PATENTS

| | | |
|---|---|---|
| 2,500,043 | 3/1950 | Radtke .................... 214/17 DB X |
| 2,814,406 | 11/1957 | Marancik ..................... 52/249 X |
| 2,942,454 | 6/1960 | Jackson ......................... 52/249 |

FOREIGN PATENTS OR APPLICATIONS

| | | |
|---|---|---|
| 254,778 | 6/1967 | Austria ..................... 214/17 DB |
| 1,032,110 | 3/1953 | France ..................... 214/17 DB |
| 1,250,360 | 9/1967 | Germany ................. 214/17 DB |

Primary Examiner—Albert J. Makay
Attorney, Agent, or Firm—Harness, Dickey & Pierce

[57] ABSTRACT

A silo or reservoir for storing free flowing solid material or bulk material, consisting of at least one vertical wall which is preferably circle symmetrical and connected to a number of upstanding supporting columns of a supporting framework, a floor and a roofstructure, a filling conveyor and a discharge conveyor in the roof and in the floor respectively and a horizontal distributor arrangement provided inside the silo for a rotational and up and down movement.

4 Claims, 2 Drawing Figures

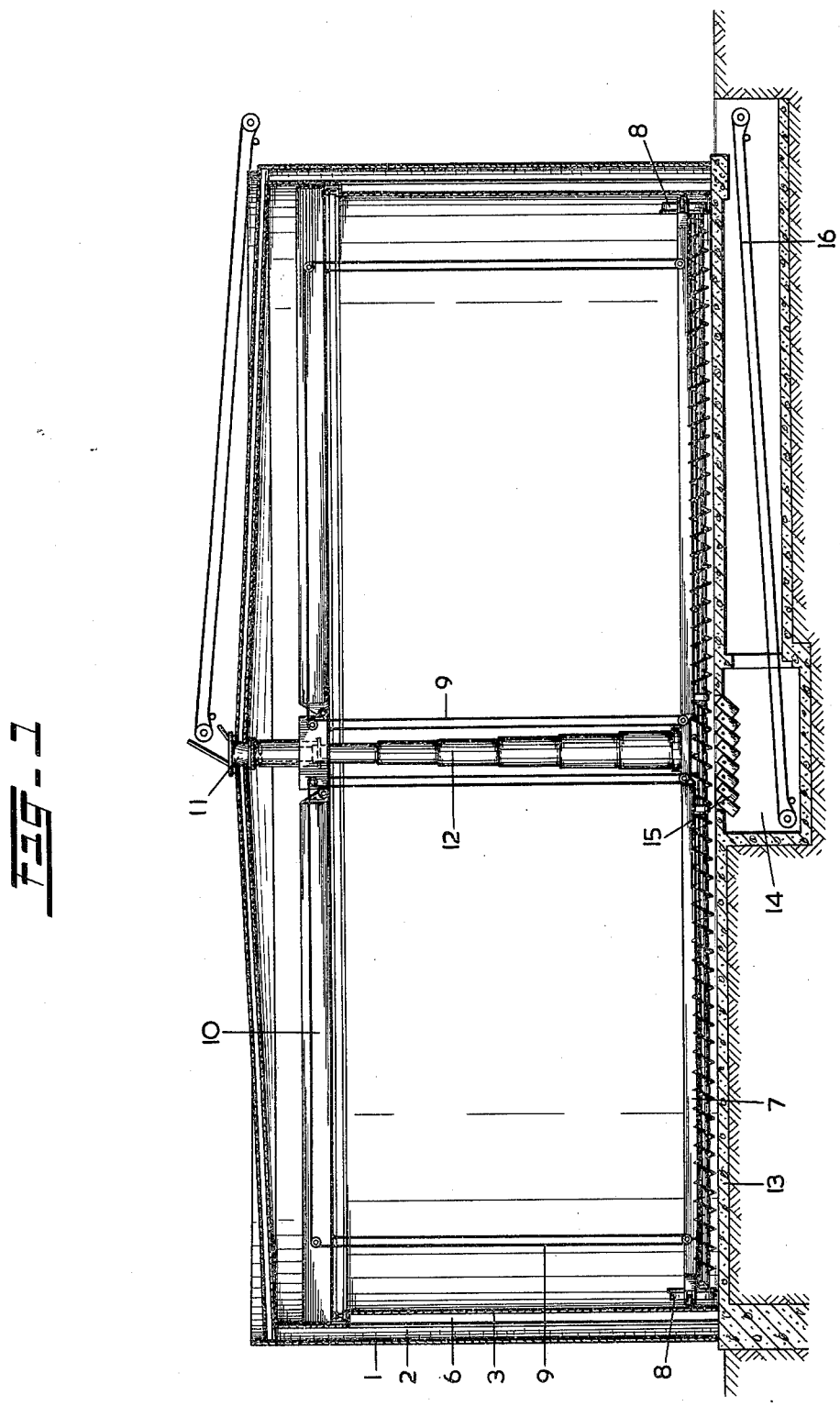

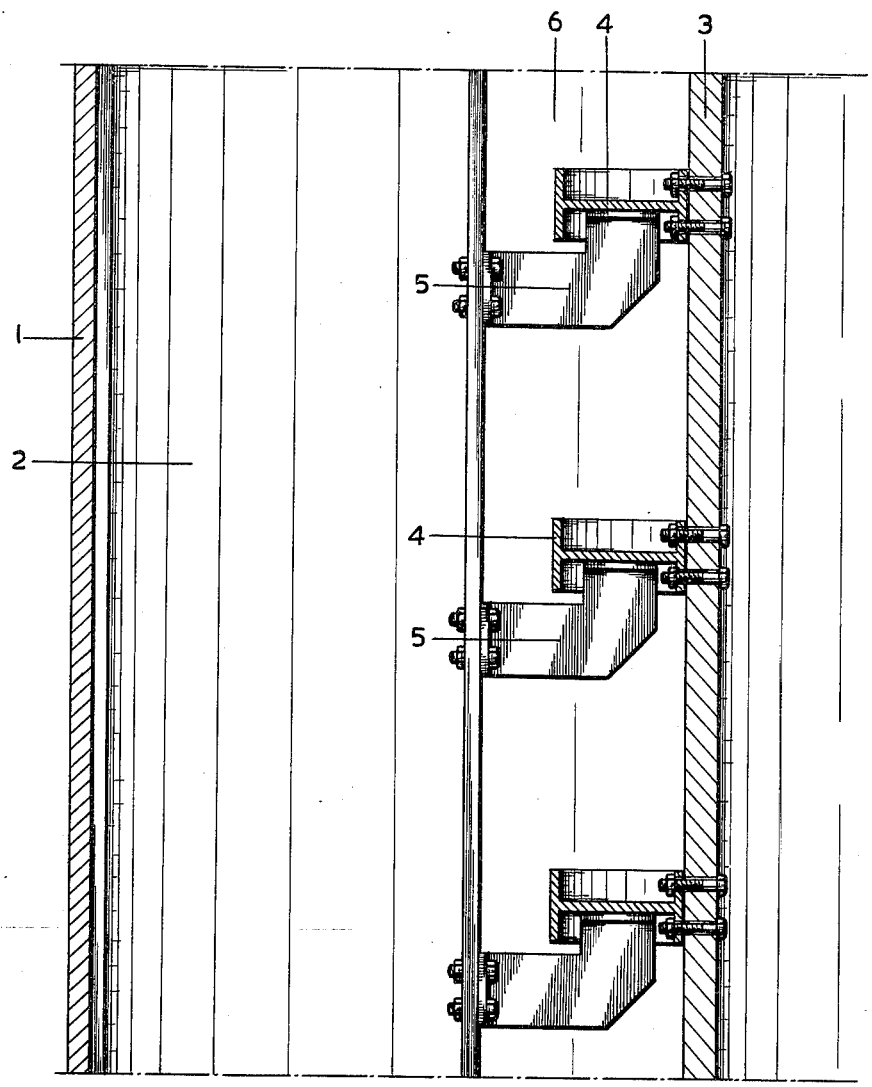

SILO OR RESERVOIR FOR FREE FLOWING SOLID MATERIAL

In constructing silos, reservoirs or the same one has used up till now a framework consisting of a number of vertically extending supporting columns to which at least one sheeting for forming the inner wall or a wall structure of any other form is fixed. This wall transmits the horizontal load to the columns of the frame-work, so that these columns are loaded in an unfavourable way. This results into especially heavy dimensioned columns, that the original circular horizontal cross section of the silo will be changed as a result of the irregular deformations and that the wall has to be fixed firmly to the columns what makes the replacement of the inner wall difficult as this can be necessary if another kind of bulk material has to be stored.

Moreover there is a centrally disposed shaft in the middle of the silo or the reservoir, said shaft serving not only to support the roof structure but particularly for guiding the horizontal distributor arrangement, for instance a screw conveyor, since as a result of the above mentioned deformation this conveyor cannot be guided along the side wall. The shaft takes up a great deal of the filling capacity of the silo and interferes with the arrangement of the filling and discharge means.

If the bulk material has to be conditioned an outer wall has to be provided and a separate piping system has to be applied or measures have to be taken allowing a free flow of air in the space between the inner and outer wall.

The present invention has for its object to obviate the above mentioned disadvantages. This is achieved in the structure according to the invention by connecting the side wall with a number of annular elements arranged in spaced relationship one above the other, which annular elements are freely supported by brackets which are connected to the inside of the supporting columns of the supporting framework. The annular elements are made for instance from profile steel or plate steel.

The annular elements serve to support the horizontal forces exerted by the bulk material on the inner wall of the silo or the reservoir. The silos or reservoir have in fact generally a circular cross section. By the bulk material an almost axial symmetrical load is then exerted to the wall. Such a load can advantageously be supported by an annular element. In this way relative small horizontal forces are exerted to the vertical supporting columns. The annular elements should have a larger cross sectional area or a smaller mutual distance as they are disposed lower down in the structure.

Advantageously a second side wall constituting the outer wall can be fixed onto the outer side of the supporting columns. In the space between the inner and outer walls means for conditioning or gasifying the bulk material stored in the silo, can be arranged as a continuous air space is formed between the inner and outer walls because of the brackets serving also as a kind of spacing elements.

The configuration of the inner wall is maintained by the stiff annular elements, even in the loaded condition. This wall can therefor be used for guiding the distributor arrangement, consisting consequently of an arrangement extending diametrically across the cross sectional area and guided at both ends along the inner wall of the silo.

The centre shaft which was necessary up till now can now be spared by the invention, therefor the filling means can advantageously be constituted by a telescopic down comer arranged in the centre, having at its upper end a hopper and of which the lower end is connected with the distributor arrangement, while the discharge means can consist of an opening constituted in the centre of the floor structure and of means arranged in the floor structure for agitating the bulk material contained in the silo, for instance a set of tiltable beams.

Preferably the distributor arrangement is connected at both ends by means of cables or the like to at least one hoisting arrangement which is mounted on a rotatable beam or similar structure extending diametrically across the cross sectional area. In the following part the invention will be explained in more detail for one embodiment of the invention, while referring to the accompanying drawing in which:

FIG. 1 shows a diametrical cross section of the silo according to the invention, and FIG. 2 shows a detail of the support of an annular element. In FIGS. 1 and 2 is shown a silo erected as a double-walled structure. The outer wall 1 is fixed directly to the columns 2 of the supporting framework. To the inner wall 3 are fixed annular elements 4, formed for instance from plate or profile steel, so that by means of these elements 4 the inner wall is freely supported by the brackets 5 which are fixed to the columns 2.

The annular elements 4 are placed closer to each other towards the lower part of the silo, while an annular element can be chosen having a heavier profile in cross section.

Because the brackets 5 serve also as a kind of spacer element between the inner wall 3 and the outer wall 1 and the supporting column 2 a continuous air space 6 is formed between these walls. This air space 6 can serve for supplying and discharging of conditioned air or special gases.

The distributor arrangement 7, for instance a conveyor screw, can be arranged diametrically across the cross sectional area without an intermediate support. Both ends 8 of the distributor arrangement 7 are guided along the inner wall of the silo. Both ends 8 are connected by means of cables 9 or similar elements with at least one hoisting arrangement mounted on a rotatable beam or similar structure extending diametrically across the cross sectional area and arranged adjacent the upper side of the silo. The distributor arrangement 7 can be combined with a centrally located filling arrangement consisting of a hopper 11 and a telescopic member 12, the lower end of which is connected with the conveyor screw.

Member 12 is a feeding tube consisting of a plurality of telescoping sections, which are retractable upwardly and extendable downwardly together with the distributor assembly 7 which is fixed to the lower telescoping section of tube 12. In the position as shown in FIG. 1 the silo is empty and ready to be loaded by means of the endless belt at the top of the silo by which the material is carried to feeding hopper 11 at the top end of feeding tube 12, so that the material falls downwardly through feeding tube 12 to the lower end thereof whereupon the material is conveyed laterally by the distributor assembly 7, which also rotates slowly in order to level the upper surface of the material fed into the silo. While feeding material into the silo the distributor is slowly hoisted by means of cables 9 which means that feeding tube 12 is retracted upwardly, so that the distributor will be always situated on top of the level of the material inside the silo. When the silo is completely filled, feeding tube 12 will be fully retracted upwardly.

In the floor structure of the silo, consisting of a concrete slab 13, is provided a centrally located pit 14 of which the upper side is closed by a tiltable beam structure 15, by means of which the silo can be emptied, the bulk material being removed to the outside by means of the conveyor belt 16.

I claim:

1. A silo or reservoir for free flowing solid material, consisting of at least one vertical side wall which is preferably circle symmetrical and connected with a number of upstanding supporting columns of a supporting framework, a floor and a roof structure, a filling means and a discharge means in the roof and in the floor respectively and a horizontal distributor arrangement provided inside the silo for a rotational and up and down movement characterized in that the side wall (3) is firmly connected with a number of continuously extending ring-like annular elements (4) arranged in spaced relationship one above the other and so shaped as to resist outward radial pressure, said annular elements (4) being freely supported by brackets (5) which are connected to the inside of the supporting columns (2) of the supporting framework and means for preventing said annular elements from sliding off said brackets.

2. A silo or reservoir according to claim 1, characterized in that the annular elements (4) are disposed at a shorter mutual distance and/or have a larger cross sectional area as the annular elements are situated lower down in the structure.

3. A silo or reservoir according to claim 1, and having a double side wall, characterized in that to the outer sides of the supporting columns a second side wall (1) is fixed, which constitutes the outer wall.

4. A silo or reservoir according to claim 1, said distributor arrangement extending across said cross-sectional area, means guiding said distributor arrangement along said side wall of the silo, said filling means comprising a telescopic member in the center of said silo, said telescopic member being connected to said distributor arrangement at its lower end, a hopper at the upper end of said telescopic member, a movable beam extending across the cross-sectional area of said silo, and a hoisting arrangement mounted on said last-mentioned beam, and connected to said distributor arrangement.

* * * * *